United States Patent
Thayer

(10) Patent No.: US 8,914,683 B2
(45) Date of Patent: Dec. 16, 2014

(54) REPAIRING HIGH-SPEED SERIAL LINKS

(75) Inventor: Larry J. Thayer, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 327 days.

(21) Appl. No.: 12/241,866

(22) Filed: Sep. 30, 2008

(65) Prior Publication Data

US 2010/0083030 A1    Apr. 1, 2010

Related U.S. Application Data

(60) Provisional application No. 61/030,411, filed on Feb. 21, 2008.

(51) Int. Cl.
| | | |
|---|---|---|
| G06F 11/00 | (2006.01) | |
| G06F 11/14 | (2006.01) | |
| G06F 11/07 | (2006.01) | |
| G06F 11/20 | (2006.01) | |

(52) U.S. Cl.
CPC ........ *G06F 11/1443* (2013.01); *G06F 11/0745* (2013.01); *G06F 11/2007* (2013.01); *G06F 11/076* (2013.01)
USPC ........................................................ 714/43

(58) Field of Classification Search
CPC ....... H04L 1/0002; H04L 45/22; H04L 45/28; G06F 11/0745; G06F 11/2007
See application file for complete search history.

(56) References Cited

U.S. PATENT DOCUMENTS

| | | | | |
|---|---|---|---|---|
| 5,406,472 | A * | 4/1995 | Simmons et al. | 700/4 |
| 7,444,558 | B2 * | 10/2008 | Mitbander et al. | 714/716 |
| 7,836,352 | B2 * | 11/2010 | Sharma et al. | 714/44 |
| 2007/0011549 | A1 * | 1/2007 | Sharma | 714/746 |
| 2008/0178052 | A1 * | 7/2008 | Das Sharma | 714/712 |
| 2008/0244146 | A1 * | 10/2008 | Das et al. | 710/309 |
| 2009/0182916 | A1 * | 7/2009 | Inagawa et al. | 710/104 |
| 2010/0083066 | A1 * | 4/2010 | Sivaramakrishnan et al. | 714/748 |

* cited by examiner

*Primary Examiner* — Michael Maskulinski
(74) *Attorney, Agent, or Firm* — William T. Ellis; Foley & Lardner LLP

(57) ABSTRACT

A method and system for repairing high speed serial links is provided. The system includes a first electronic components, connected to at least a second electronic component via at least one link. At least one of the first or second electronic components has a link controller. The link controller is configured to repair serial links by detecting a link error and mapping out individual lanes of a link where the link error is detected. The link controller resumes operation, i.e., transmission of data and continues to monitor the lanes for errors. If and when additional link errors occur, the link controller identifies the lanes in which the link error occurs and deactivates those lanes. The deactivated lane(s) can not be used in further transmissions which, in turn, reduces the occurrence of intermittent link errors.

13 Claims, 3 Drawing Sheets

REPAIRING HIGH-SPEED SERIAL LINKS

CROSS REFERENCE TO RELATED APPLICATIONS

This Application claims the benefit of U.S. Provisional Application Ser. No. 61/030,411 filed Feb. 21, 2008, titled "REPAIRING HIGH-SPEED SERIAL LINKS" which is hereby incorporated by reference herein as if reproduced in full below.

FIELD OF THE INVENTION

The present invention relates generally to the field of high-speed serial links, and more particularly to error detection and error handling in high-speed serial links.

BACKGROUND OF THE INVENTION

The following description of the background of the invention is provided simply as an aid in understanding the invention and is not admitted to describe or constitute prior art to the invention.

High-speed serial links ("HSSL") are an increasingly-popular method for interconnecting semiconductor components. HSSL may be used in the following technologies: fabric interconnect, memory interface (FBD), I/O interface (PCI-Express) and CPU connections (CIS). HSSL involve complex circuitry and can often run long distances within a system.

Link errors may occur on high-speed serial links which can cause numerous problems including transmission failure. There are a large number of types of link errors including, but not limited to a broken connection, an intermittent connection, a degraded connection, an incorrectly seated connector, system noise, soft errors in the physical block and hard errors in the physical block. Link errors can cause a number of problems including a continuous stream of bit errors, seemingly random errors, the occurrence of multiple intermittent bits or degraded bits, the failing of single or multiple bits, non-repeating single-channel errors and permanent or intermittent failures of a channel or link. Causes of link errors can include the gross failure of a connector, vibration, a cracked solder ball or trace, a corroded or contaminated connector, poor installation, disk or DRAM, radiation and ESD or latent defects. Accordingly, there are a large number of possible failure modes in high speed serial links, with a correspondingly large number of observable symptoms. Thus, it is important to be able to isolate and correct link errors in an efficient manner.

Repairing links in real-time while minimizing the risk of undetected transmission errors requires hardware to monitor error activity and invoke resilience mechanisms if too many errors occur. If a link is operating properly the error rate should be zero. However, it is difficult to determine how to treat intermittent failure since they only occur periodically. Intermittent failures on links are difficult to debug. Furthermore, certain types of multi-bit errors are not detected by conventional CRC (cyclical redundancy checks). Allowing too many intermittent errors to occur without corrective action to repair the link can result in undetected serious errors and silent data corruption (SDC).

In order to minimize the probability of SDC on links, link controllers must implement hardware to perform error handling. However, with intermittent errors it is difficult to identify individual lanes in a serial link that are causing the errors and need repair. Further, a link controller's capacity to handle errors is limited by the capacity of the error analysis engine and the rate at which link controller's might receive error information.

Accordingly, conventional systems address intermittent errors after their occurrence reaches a certain threshold. Unfortunately, several undetected errors can occur before repair begins and waiting to repair a link at this stage has several negative consequences. Thus, there is a need for a system and method for efficiently detecting and repairing intermittent errors in high speed serial links during operation.

SUMMARY OF THE INVENTION

According to one embodiment, a method for repairing serial links includes the steps of detecting a link error, mapping out individual lanes of a link where the link error is detected, resuming operation and monitoring the lanes for errors, identifying the lanes in which the link error occurs and deactivating the lanes in which the link error has occurred in order to reduce the occurrence of intermittent link errors.

According to another embodiment, a method for repairing serial links includes the steps of detecting a link error, retrying a transmission when the link error is detected if the number of link errors that have occurred exceeds a link error threshold, retraining the link by sparring out lanes in which the link error occurred if the link error occurs after retrying the transmission, reducing the frequency at which data is transmitted if the number of link errors that occur during retraining exceed a retraining threshold, mapping out individual lanes of a link where the link error is detected, resuming operation and monitoring the lanes for errors, identifying the lanes in which the link error occurs and deactivating the lanes in which the link error has occurred in order to reduce the occurrence of intermittent link errors.

According to yet another embodiment, a system for repairing serial links, includes a first electronic component, connected to at least a second electronic component via at least one link, wherein at least one of the first or second electronic components has a link controller. The link controller is configured to detect link errors, map out individual lanes when a link error is detected, monitor the lanes for errors, identify the lanes in which an error occurs and deactivate the lanes in which the error has occurred in order to reduce the occurrence of intermittent link errors.

It is to be understood that both the foregoing general description and the following detailed description are exemplary and explanatory only, and are not restrictive of the invention as claimed.

BRIEF DESCRIPTION OF THE DRAWINGS

Features, aspects and advantages of the present invention will become apparent from the following description, appended claims, and the accompanying exemplary embodiments shown in the drawings, which are briefly described below.

DETAILED DESCRIPTION OF THE PREFERRED EMBODIMENTS

Embodiments of the present invention will be described below with reference to the accompanying drawings. It should be understood that the following description is intended to describe exemplary embodiments of the invention, and not to limit the invention.

Figure 1:
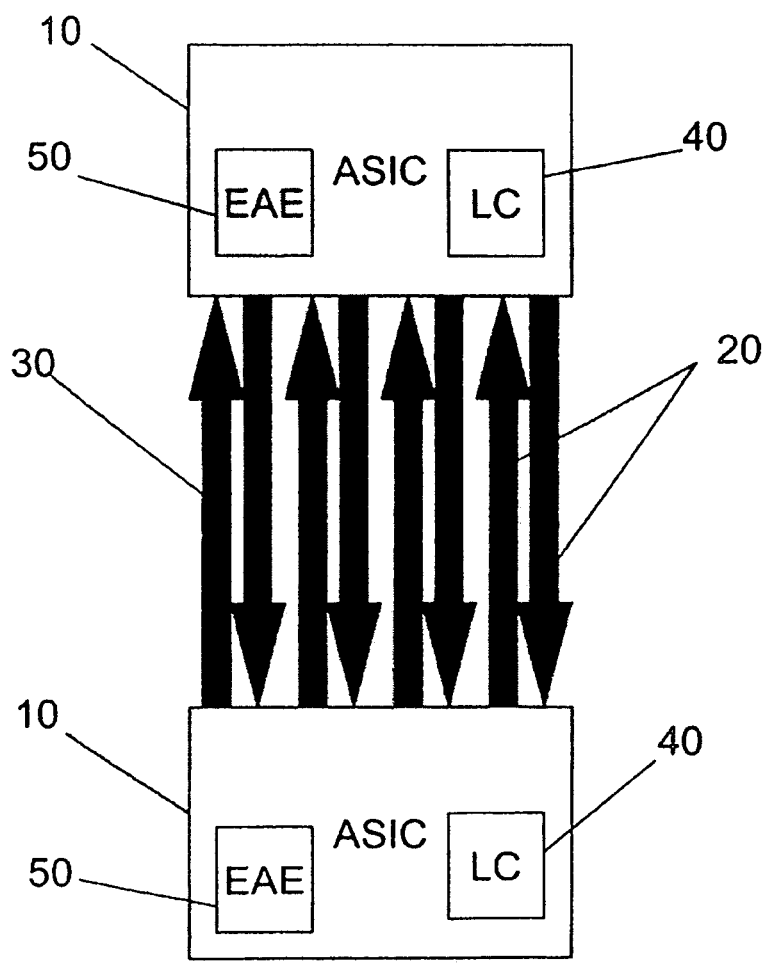
FIG. 1 is a block diagram of two ASICs connected via links according to one embodiment.

FIG. 1 shows two application specific integrated circuits (ASICs) 10, having a link controller (LC) 40 and an error analysis engine (EAE) 50, connected via a plurality of links 20. Each link 20 can have multiple lanes 30. Between the two ASICs 10 there can be one or more lanes 30 of communication. Packets of data can be transmitted across each lane 30. Each lane 30 can represent a set of differential signal pairs where one is used for transmission and one is used for reception. It should be noted that the ASICs 10 can be any type of functional electric component or semiconductor component including but not limited to a processor, memory, a multiplexer, or a digital signal processor, etc.

The link controller 40 monitors and controls the links 20 connecting the ASICs 10. If the link controller 40 detects a link error, the link controller 40 can attempt to retransmit data using the link 20 and lane 30 that the link error was detected on. Errors are detected using cyclic redundancy checks (CRC). Each frame of transmitted data contains CRC bits which are compared at the source and destination device. If the CRC bits do not match then an error is determined to have occurred. CRCs are useful in finding errors in single bits and single lanes 30. The larger the number of CRC bits the greater the chance that the CRC bits will detect multiple bit errors. Further, the link controller 40 can track information concerning link errors, including but not limited to, number or errors that have occurred, time of errors, etc.

The link controller 40 implements at least four levels of repair/error handling in order to correct a detected link error. The first level of repair/error handling is to retry the transmission. The link controller 40 simply retries the transmission. The second level of repair/error handling is re-training, i.e. the link controller 40 re-adjusts the expected arrival times of the data and fixes lane 30 failures by sparring out or eliminating transmission of data on the failed lanes. The third level of repair/error handling is frequency reduction. During frequency reduction, the link controller 40 reduces the frequency at which data is transmitted via a link 20. A fourth level of repair/error handling comprises mapping out lanes 30. During mapping, the link controller maps out each lane 30 or a group of lanes 30 of each link 20. The link controller 40 monitors each lane 30 to determine whether an error occurs. If an error occurs, the link controller 40 makes note of which lane 30 the error occurred on so that that lane 30 and/or corresponding link 20 is not used in future communications. The link controller 40 is configured to automatically sequence through any one of the repair levels in any order.

Figure 2:
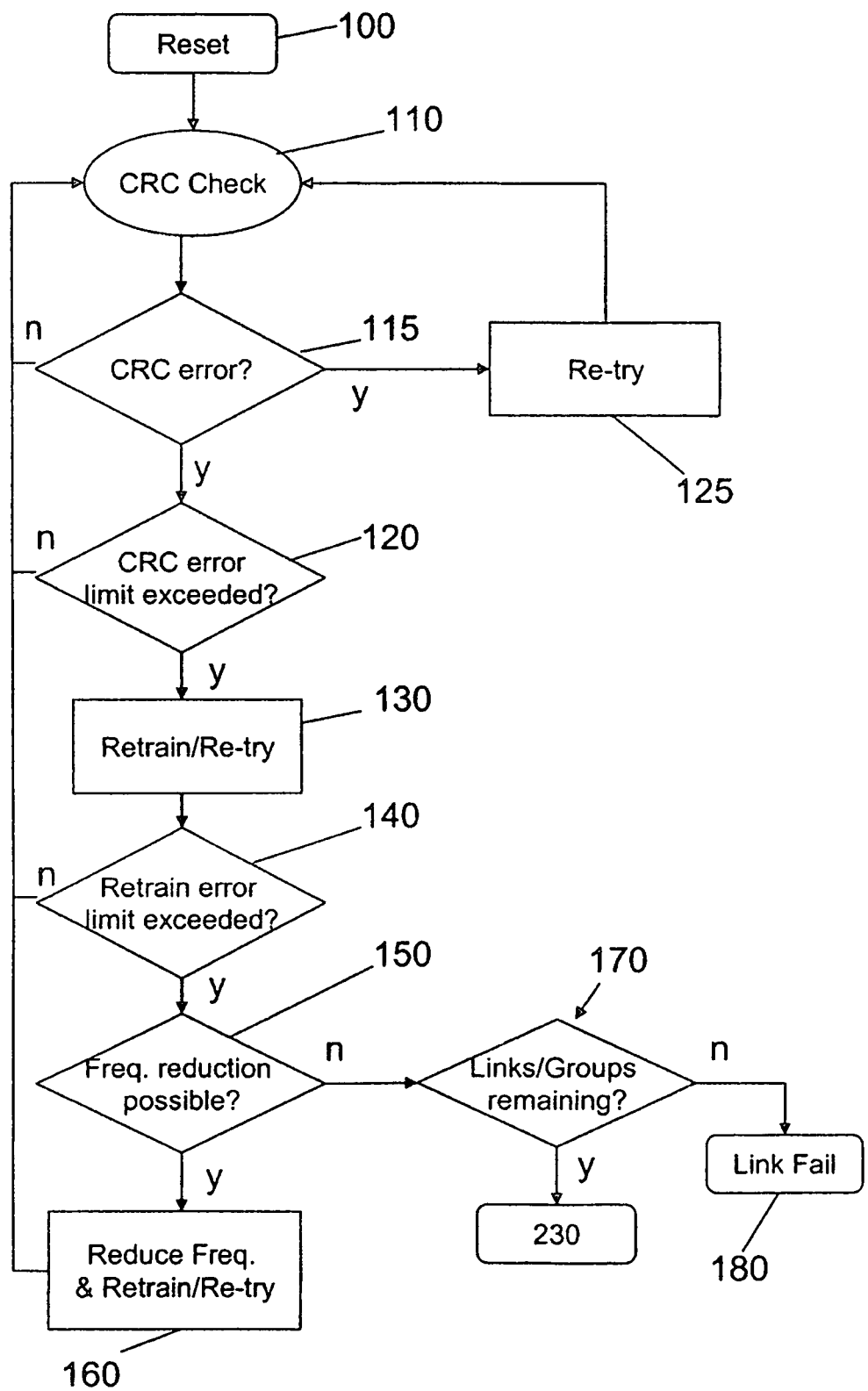
FIG. 2 is a flow chart illustrating a method for repairing a high speed serial link according to one embodiment.
Figure 3:
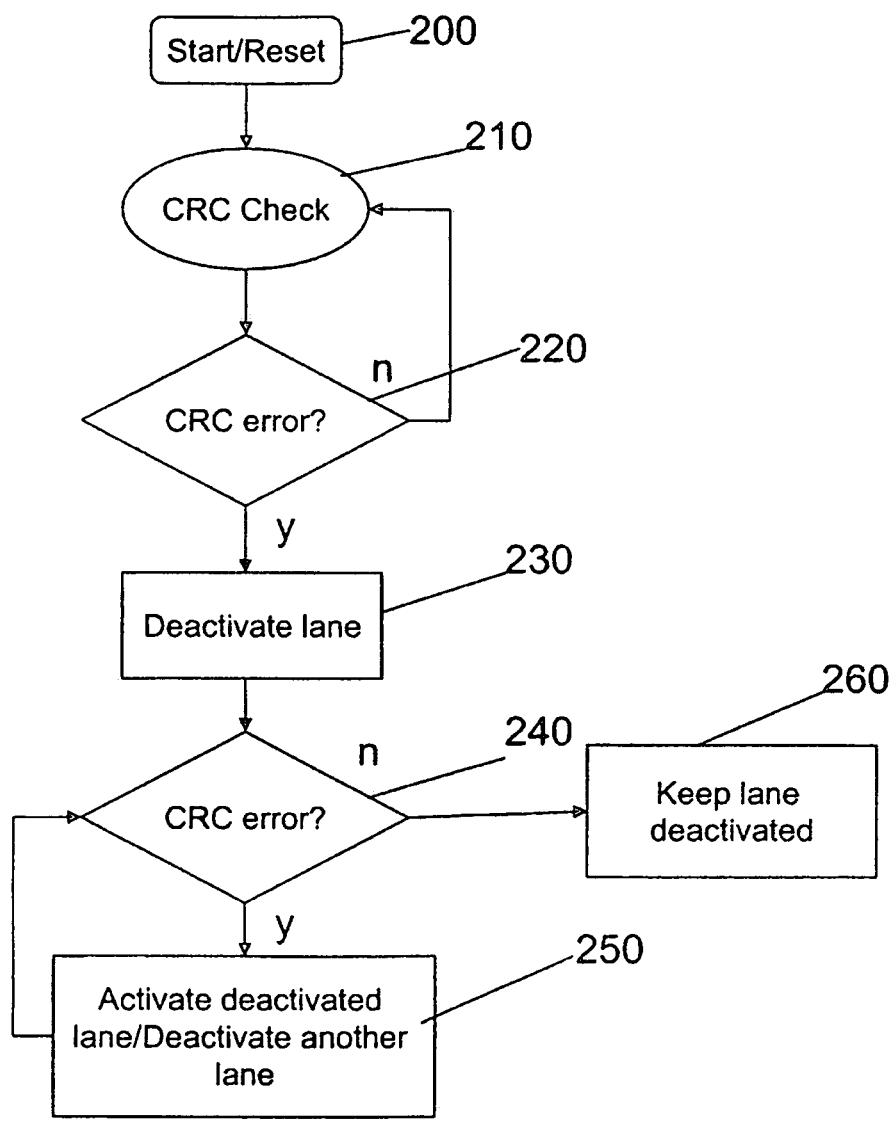
FIG. 3 is a flow chart illustrating a method for repairing a high speed serial link according to another embodiment.

A method for implementing repair/error handling in high speed serial links will now be described. As shown in FIGS. 2 and 3, the present method steps through resilience mechanisms for repairing links one at a time in order to minimize system-level impact and silent data corruption. Individual lanes 30 in each link 20 can be mapped out one-at-a-time. During mapping, links 20 between devices are identified and the width (number of lanes 30) of a link 20 can be determined. A map of where and how data traffic will flow in each link 20 is generated. If an error occurs when a selected lane 30 is being used to transmit data, then the method selects a new mapped lane 30 for carrying out the data transmission.

As shown in FIG. 3, the method may begin with a system start or reset (Step 100). According to one embodiment, a method for detecting link errors comprises determining whether a link error has occurred (Step 110, 220). If an error has occurred, the method maps out a lane 30 or group of lanes 30 (Step 230) to obtain one or more mapped lanes and continues operation. If an error is detected on one of the mapped lanes (Step 240) the mapped lane 30 is determined to be a failure and is identified by the link controller 40 as a lane 30 that should not be used in further communications (Step 250). The method deactivates the lane 30 and or link 20 to prevent the occurrence of additional intermittent errors (Step 260).

According to another embodiment, a method for link error handling employs the above mentioned levels of error-handling in a tiered step-by-step approach. As shown in FIG. 2, first, the method executes a CRC check (Step 110).

If the number of CRC errors exceeds a certain threshold (Step 120) then the method attempts retrying the data transmission (Step 130). According to one embodiment, the method executes an automatic re-try upon detecting a CRC failure. According to one embodiment, if the retry fails then the method attempts to retrain the link 30 or lane 30 upon which the error was detected (Step 130). According to still another embodiment, the method retrains the links 20 of lanes 30 and retries the transmission in a single step (Step 130). If the number of errors that occur during retraining exceed a certain threshold (Step 140) then the method determines if frequency reduction is possible (Step 150).

As shown in FIG. 2, if frequency reduction is possible, the method reduces the frequency of the transmission, executes a retrain/retry (Step 160) and then performs a CRC check (Step 110).

According to one embodiment, if frequency reduction is not possible (Step 150) and if there exist additional links 20 or link groups that can be used for transmission (Step 170), the method maps out a next lane 30, link 20 or group of links 20 (Step 180). Once a lane 30 or link 20 is mapped, it is retrained (Step 185) and a CRC check is executed (Step 110). The method may execute the above-described process for each lane 30, link 20 or groups of links 20 that are mapped. If a lane 30, link 20 or group of links 20 fail the above-mentioned resiliency tests and there are no more links 20 or lanes 30 to be mapped, then the method determines that the link 20 has failed (Step 190). Once failed lanes 30 or links 20 are identified, the link controller 40 remembers the failed ink or lane and can execute transmissions without using the failed lane 30 or link 20 which, in turn will reduce the occurrence of intermittent errors.

Each threshold (120, 140) can be determined by a counter. The counter amount can be customized based on design preferences. Further, after a predetermined length of operation (several days, weeks, etc.) the method can allow the EAE 50 to reset the counters so that a correctional step is not taken in response to a cumulative number of errors that have occurred over an acceptable length of time.

The above-described system and method has several advantages. The method has a very fast response time to link errors and therefore minimizes the risk of undetected errors because the total number if errors before repair will be a small number. In turn, this minimizes the amount of link degradation that can occur. Further, having the hardware count error occurrences and automatically sequence through the resilience mechanisms (including mapping out lanes) means that any intermittent error will quickly be repaired, or (if necessary) the link shut down before the intermittent error can cause more serious performance flaws.

The foregoing description of a preferred embodiment of the invention has been presented for purposes of illustration and description. It is not intended to be exhaustive or to limit the invention to the precise form disclosed, and modifications and variations are possible in light of the above teaching or may be acquired from practice of the invention. The embodiment was chosen and described in order to explain the principles of the invention and as a practical application to enable one skilled in the art to utilize the invention in various embodiments and with various modification are suited to the particular use contemplated. It is intended that the scope of the invention be defined by the claims appended hereto and their equivalents.

What is claimed is:

1. A method for repairing serial links, comprising:
   detecting a link error;
   mapping out individual lanes of a link where the link error is detected;
   monitoring the lanes for errors during operation;
   identifying the lanes in which the link error occurs;
   retraining the link by sparring out lanes in which an error occurs when a link error is detected;
   reducing the frequency at which data is transmitted if the number of link errors that occur during retraining exceed a retraining threshold; and
   deactivating the lanes in which the link error has occurred in order to reduce the occurrence of intermittent link errors.

2. The method for repairing serial links as claimed in claim 1, further comprising retrying a transmission when a link error is detected if the number of link errors that have occurred exceeds a link error threshold.

3. The method for repairing serial links as claimed in claim 1, further comprising automatically retrying a transmission when a link error is detected.

4. The method for repairing serial links as claimed in claim 1, wherein the link errors are detected using cyclic redundancy checks.

5. A method for repairing serial links, comprising:
   detecting a link error;
   retrying a transmission when the link error is detected if the number of link errors that have occurred exceeds a link error threshold;
   retraining the link by sparring out lanes in which the link error occurred if the link error occurs after retrying the transmission;
   reducing the frequency at which data is transmitted if the number of link errors that occur during retraining exceed a retraining threshold;
   identifying remaining links or groups of links for use in the transmission if frequency reduction is not possible;
   mapping out individual lanes of a link, if there are remaining links or groups of links;
   retraining the individual lanes;
   monitoring the lanes for errors during operation; and
   identifying the link in which the link error occurs, if there are no remaining links or groups of links to be mapped.

6. A system comprising:
   a first electronic component; and
   a second electronic component connected to the first electronic component by a link and comprising a link controller to:
   detect a link error;
   map out individual lanes of the link where the link error is detected;
   monitor the lanes for errors during operation;
   identify the lanes in which the link error occurs;
   retrain the link by sparring out lanes in which an error occurs when a link error is detected;
   reduce the frequency at which data is transmitted if the number of link errors that occur during retraining exceed a retraining threshold; and
   deactivate the lanes in which the link error has occurred in order to reduce the occurrence of intermittent link errors.

7. The system as claimed in claim 6, wherein the link controller is to retry a transmission when a link error is detected if the number of link errors that have occurred exceeds a link error threshold.

8. The system as claimed in claim 6, wherein the link controller is to automatically retry a transmission when a link error is detected.

9. The system as claimed in claim 6, wherein the link errors are detected using cyclic redundancy checks.

10. An electronic component comprising a link controller to:
    detect a link error;
    map out individual lanes of a link where the link error is detected;
    monitor the lanes for errors during operation;
    identify the lanes in which the link error occurs;
    retrain the link by sparring out lanes in which an error occurs when a link error is detected;
    reduce the frequency at which data is transmitted if the number of link errors that occur during retraining exceed a retraining threshold; and
    deactivate the lanes in which the link error has occurred in order to reduce the occurrence of intermittent link errors.

11. The electronic component as claimed in claim 10, wherein the link controller is to retry a transmission when a link error is detected if the number of link errors that have occurred exceeds a link error threshold.

12. The electronic component as claimed in claim 10, wherein the link controller is to automatically retry a transmission when a link error is detected.

13. The electronic component as claimed in claim 10, wherein the link errors are detected using cyclic redundancy checks.

* * * * *